United States Patent [19]

Daimer

[11] 4,055,404
[45] Oct. 25, 1977

[54] PROCESS FOR COLLECTING PAINT SPRAY MISTS IN SPRAY PAINT OPERATION

[76] Inventor: Wolfgang Daimer, Hilmgasse 15/9, A 8010 Graz, Austria

[21] Appl. No.: 593,950

[22] Filed: July 8, 1975

[30] Foreign Application Priority Data

July 10, 1974  Germany ............................ 2433193

[51] Int. Cl.² .............................................. B01D 47/06
[52] U.S. Cl. .......................................... 55/85; 134/13; 134/38; 252/DIG. 8
[58] Field of Search ....................... 55/84, 85, 89, 228, 55/421; 210/42, 44, 167; 98/115 SB; 252/DIG. 8; 134/13, 38

[56] References Cited

U.S. PATENT DOCUMENTS

| | | | |
|---|---|---|---|
| 2,362,964 | 11/1944 | Affleck | 55/228 |
| 2,479,629 | 8/1949 | McKee et al. | 252/DIG. 8 |
| 2,928,498 | 3/1960 | Paul et al. | 55/87 |
| 2,981,525 | 4/1961 | Umbright | 210/167 |
| 3,372,129 | 3/1968 | Phillips | 210/54 |
| 3,429,823 | 2/1969 | Cataneo | 252/DIG. 8 |
| 3,544,476 | 12/1970 | Alba et al. | 210/42 |
| 3,764,013 | 10/1973 | Eisemann | 210/44 |
| 3,861,887 | 1/1975 | Forney | 55/85 |

Primary Examiner—Frank W. Lutter
Assistant Examiner—David L. Lacey
Attorney, Agent, or Firm—A. W. Breiner

[57] ABSTRACT

An improvement in a process for the separation of aqueous paint spray mists from the environment of a paint spray operation employing a water rinse technique is described. According to the improvement, rinse water is mixed with a water-soluble, substantially non-volatile, low molecular weight, salt-like electrolyte in a quantity sufficient so that the specific weight of the aqueous salt solution at 20° C. is at least 1.01. The electrolyte solution causes the paint to coagulate from the water mixture for convenient separation by decantation, filtration, or the like.

9 Claims, No Drawings

PROCESS FOR COLLECTING PAINT SPRAY MISTS IN SPRAY PAINT OPERATION

The present invention is directed to a method of separating and recovering paint spray mists from a spray painting operation. More particularly, the invention is concerned with separating aqueous paint spray mists from the environment of a paint spray operation employing a water rinse technique whereby the paint is conveniently recovered and the water rinse recycled.

In the application of paints by spraying in spray booths or spray shops, paint mists which do not contact the object being painted cause losses in paint which can attain as much as 80 percent of the total amount of paint sprayed. The mists, in order not to be of environmental or toxological hazard, must be removed from the exhaust air. For this purpose, counter panels or filters of fibre material are at times used. Such panels or filters have the disadvantage in that they clog upon prolonged use and have to be renewed at short intervals. In an effort to avoid such disadvantage, attempts have been made to remove the spray paint mists from the air by washing with water. Continuous working and substantially increased cleaning is thereby obtained with simultaneous reduction in explosion hazard in comparison to filter separation. Various principles for construction of water washing systems have been suggested for possibly complete removal of the paint including flow washing, valve washing, cascade washing, Venturi type washing, Bullows No-pump, and combination of such washing systems. The removed paint particles, depending on their specific weight, either sediment as paint slurry in the tank, or the paint will float on the surface of the water as a cake or scum and removed therefrom by skimming. The water is disposed of, or, optionally after additional filtration, is returned to the spray circuit. Particulars can be obtained from F. Rüb, Spray booths and cabins Industrie-Lackier-betrieb, 41, page 21 (1973).

It can easily be seen that in accordance with the above methods only the spray mists which are substantially insoluble in water can be removed from the rinse water. Such paints are usually either based on powders, or are exclusively diluted with organic solvents. The organic solvents used preferably consist of aliphatic or aromatic hydrocarbons, e.g., benzene, cycloalkanes, toluene, xylene, or homologues thereof; or of esters such as ethyl acetate, butyl acetate, etc.; or ketones such as acetone, methylethylketone, or homologues thereof, or in lower proportions, alcohols such as ethanol or butanol. These organic solvents, as is known, are toxic and represent an explosion or fire hazard. Additionally, they will form smogs and are at times not readily available.

Accordingly, due to the problems with organic solvents, for quite some time there has been a trend in the paint industry to use a coating media or paint which preferably contains water as the solvent and no or only low levels of organic solvents. Where finely dispersed dispersions are not essential, the water-dilutable binders usually consist of macropolyions which upon neutralization with a counter ion form an salt-like structure and, therefore, form true solutions or colloidal solutions. At times, in addition to dispersions, mainly macropolyanions and, in smaller quantities, macropolycations are used as binders for aqueous coating compositions. The commmon use of such binders, acceptable from the ecological standpoint, is hindered in that the spray mists are partially or completely dissolved by the rinse water. Only the pigments which are only optionally present in the paint will sediment at high dilution ratios to permit ready separation by simple phase decantation. The binding media remain in the waste water and, thus, have to be removed before the clean water is allowed to flow back to the spray circuit or is otherwise disposed of. In normal precipitation procedure, strong mineral acids are used for coagulating the macropolyanions, the excess acids having to be neutralized again after the coagulate has been removed. In turn, organic acids have to be carried away with waste water. According to another process for their removal, salt solutions of amphoteric metals are added to the waste water carrying the binders. The metal salts, at high dilution ratios, hydrolize to water-insoluble precipitates (primarily aluminium hydroxide or ferrous hydroxide), binding the suspended binder particles or colloids by absorption. However, this latter method fails to remove all low molecular organic compounds from the water, such as the amines used in neutralization or the remnants of auxiliary organic solvents.

The present invention is primarily concerned with a process of avoiding the described disadvantages in the spray application of water diluted paints in water flush spraying shops or in cleaning rinse water from paint spray mists. The process of the invention in an extremely simple way enables the rinse water to be recirculated after having been separated from the spray mists without the use of precipitating agents. In this manner, the economy of the rinse water in a spray booth is markedly improved, and the waste water in the sewage is virtually clean.

The process of the invention for separating spray mists of water-dilutable paints from exhaust air and effluent water in spray shops is characterized in that water-soluble, low volatility, low molecular, salt-like electrolytes are added to the water used for rinsing in the spray shops and/or for separating the spray mists in quantites such that the specific weight of the aqueous salt solution at 20° C. is at least 1.01 g/cm$^3$, preferably at least 1.10. The slurry is separated from the water in known manner by decantation, filtration, etc.

The salt-like electrolytes which can be used in accordance with this invention are water-soluble, substantially non-volatile, low molecular weight electrolytes. The electrolyte is employed in a quantity sufficient to provide a specific weight of aqueous salt solution at 20° C. of at least 1.01, and preferably at least 1.10. Specific examples of suitable salt-like electrolytes are halogenides, halogenates, hypohalogenates, sulfates, sulfites, hyposulfites, peroxodisulfates, pyrosulfates, bisulfates, nitrates, nitrites, primary phosphates, secondary phosphates, tertiary phosphates, hydrophosphates, pyrophosphates, phosphites, hypophosphites, chromates, bichromates, permanganates, arsenates, stibiates, stannates, carbonates, bicarbonates, carbamates, formiates, acetates, oxalates, lactates, benzoates of metals of the main group of Groups I and II of the Mendeleen Periodic Table, as well as of the side group of Groups I, II, IV, V, VI, and VIII of the Mendeleev Periodic Table of elements, ammonium, and the aliphatic amines. Among the electrolytes particularly suitable are sodium chloride, calcium chloride, primary and secondary sodium sulfate, primary, secondary, and tertiary sodium phosphate, ammonium carbonate, and ammonium phosphate.

The specific weight of the aqueous solutions of the invention is determined by known methods, e.g., with the aid of a pycnometer or with calibrated dip bodies (spindles). The pH value of the salt solutions, of the invention is preferably between 3 and 10. The water-soluble materials used to increase the specific weight are used preferably in saturated concentration or somewhat below in order to avoid the formation of solid precipitates with temperature fluctuations or with volatilization losses.

According to the method of invention, the paint spray mist is caused to coagulate the moment the mist reaches the water wall. At this time partial or total solution of the paint media cannot occur, since the water-soluble organic binders are insoluble in the salt electrolyte solutions over the stated broad range of concentration of the latter. Owing to the higher specific weight of the aqueous phase, the coagulated binders float as an upper layer or scum and can easily be removed by known skimming devices or similar equipment. Through the salting out by the concentrated electrolyte solutions, hydrophilic organic auxiliary solvents like alcohols are not dissolved in the aqueous phase, but remain in the floating organic phase. Thus, they do not increase the explosion hazard of the rinse water. The clarified electrolyte-containing water, optionally freed from suspended pigments through simple filtration, is recycled to the spray booth. The separated paint coagulate is either deposited, pyrolyzed, or re-used after elimination of the salt residue.

The method is suitable for application in any normal spray shop, e.g., spray booths, spray walls, spray benches, or spray boxes, in open or closed construction, with vertical or horizontal exhaust ducts. There are no restrictions with respect to the coating method which can be manual or automatic, through air atomization, airless spraying, hot spraying, or electrostatic spraying. For any mentioned construction, the spray mists can be washed by the method of the present invention.

Having described the invention in general terms, the following examples, where parts are by weight, will be set forth.

EXAMPLE 1

A solution of 6 parts by weight of $Na_2HPO_4$ in 94 parts of water was prepared for use as rinse water for cleaning spray mists in a spray booth. The specific weight of the solution is 1.08 g/cm$^3$ at 20° C.

200 g of an aqueous paint pigmented with titanium dioxide and copper phthalocyanine to give a blue color with a solids content of 62 percent, with the binder being a triethylamine neutralized polycarboxylic acid resin and hexamethoxymethyl melamine, is atomized at a pressure of 4.5 atmospheres without an object being coated.

To determine the clarifying effect, the rinse water used to wash the atomized paint is collected in a pool and allowed to settle. The blue paint coagulate floats on the surface as a tacky layer and is skimmed quantitatively. The aqueous phase underneath the tacky layer is clear and water-white. The paint coagulate is dissolved in a 4:1 blend of butanol and xylol, transferred to a decanter, and the remainder of the electrolyte solution is decanted. After volatilization of the solvent, 117 g of solids remain. With a total of 124 g of atomized solids, the calculated efficiency is 94 percent.

EXAMPLE 2

A solution of 14 parts by weight of sodium chloride in 86 parts by weight of water is used as the rinse water for flushing spray mists. The specific gravity of the rinse solution is 1.2 g/cm$^3$ at 20° C.

A test is carried out analogous to Example 1, with a clarifying efficiency of 94.5 percent. Upon decanting the paint coagulate, the water is clear and water-white.

EXAMPLE 3

A solution of 40 parts byweight of calcium chloride in 60 parts by weight of water is used to flush the spray mists. The specific gravity of the solution is 1.43 g/cm$^3$ at 20° C.

200 g of an aqueous paint pigmented with titanium dioxide, with 54 percent solids and a binder consisting of a fine particle dispersion in water of a copolymer of vinyl acetate, butylacrylate, and styrene, is atomized with a pressure of 2 atmospheres.

The rinse water with the white paint coagulate floating at the surface is clear and water-white. The clarifying efficiency, calculated analogous to Example 1, is about 96 percent.

COMPARISON EXAMPLE A

Water taken directly from a conventional water supply and having a hardness of 10° (German scale) without any additives is used for rinsing a spray booth.

Upon atomization of the blue paint according to Example 1, no paint coagulate floats on top of the water, but rather the water in total is bluish-opaque. After a few days of standing, a part of the pigments has settled to the bottom, with the aqueous layer still opaque. The addition of sulphuric acid until a pH value of 2 is reached permits the remaining impurities to be seperated by coagulation.

COMPARISON EXAMPLE B

This example shows the effect of concentrated aqueous solutions with increased specific weight prepared by dissolving non-electrolytes.

The rinse water of an open spray booth consists of a solution of 40 parts by weight of urea in 60 parts by weight of water. The specific weight of the solution is 1.11 g/cm$^3$ at 20° C.

Upon atomization of the blue paint, according to Example 1, no coagulate will form and the rinse water is blue and opaque. This test establishes that the concentrated non-electrolyte solution has no purifying effect.

It is claimed:

1. In a process for the separation of spray mists of water dilutable paints from the environment of a paint spray operation employing a water rinse or wash technique, the improvement wherein in rinse or wash water used to rinse the spray shops and/or wash the spray mist is mixed with a water-soluble, substantially non-volatile, low molecular weight, salt-like electrolyte, said electrolyte being present in an amount sufficient to provide an aqueous salt solution which, at 20° C., has a specific weight of at least 1.01, causing paint to coagulate so as to permit separation from the rinse water in known manner.

2. The process of claim 1 wherein the specific weight of the aqueous salt solution is at least 1.10.

3. The process of claim 1 wherein the salt-like electrolyte is the salt of a metal selected from the main group of Groups I and II; the side groups of I, II, IV, V, VI, and VIII of the Mendeleev's Periodic Table of elements.

4. The method of claim 3 wherein the salt-like electrolyte includes an inorganic acid radical.

5. The method of claim 3 wherein the salt-like electrolyte includes an organic acid radical.

6. The process of claim 1 wherein the salt-like electrolyte is a salt of ammonia or an aliphatic amine.

7. The process of claim 1 wherein said salt-like electrolyte is selected from the group consisting of sodium chloride; calcium chloride; primary and secondary sodium sulfate; primary, secondary, tertiary sodium phosphate; ammonium carbonate, and ammonium phosphate.

8. The process of claim 1 wherein the pH value of the salt solution is adjusted to fall within the range of from about 3 to 10.

9. The process of claim 1 wherein the paint coagulate is separated from the rinse solution and the rinse solution is recycled.

* * * * *